United States Patent
Terazono et al.

(10) Patent No.: US 8,557,470 B2
(45) Date of Patent: Oct. 15, 2013

(54) MEMBRANE/ELECTRODE ASSEMBLY FOR POLYMER ELECTROLYTE FUEL CELL AND PROCESS FOR PRODUCING MEMBRANE/ELECTRODE ASSEMBLY FOR POLYMER ELECTROLYTE FUEL CELL

(75) Inventors: Shinji Terazono, Chiyoda-ku (JP); Kohta Yamada, Chiyoda-ku (JP); Hiroshi Shimoda, Chiyoda-ku (JP); Widjaja Hardiyanto, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 1142 days.

(21) Appl. No.: 12/340,090

(22) Filed: Dec. 19, 2008

(65) Prior Publication Data
US 2009/0162725 A1 Jun. 25, 2009

(30) Foreign Application Priority Data
Dec. 21, 2007 (JP) ................................. 2007-330890

(51) Int. Cl.
H01M 4/92 (2006.01)
H01M 8/10 (2006.01)
H01M 4/36 (2006.01)

(52) U.S. Cl.
USPC ............ 429/487; 429/484; 429/523; 429/524

(58) Field of Classification Search
None
See application file for complete search history.

(56) References Cited

U.S. PATENT DOCUMENTS

| 6,517,962 B1 * | 2/2003 | Knights et al. ............... 429/450 |
| 2002/0009626 A1 | 1/2002 | Terazono et al. |
| 2007/0111085 A1 * | 5/2007 | Sugimasa et al. ............. 429/42 |
| 2008/0193827 A1 * | 8/2008 | Jang et al. ...................... 429/41 |

FOREIGN PATENT DOCUMENTS

| WO | WO 01/15247 A2 | 3/2001 |
| WO | WO 01/15254 A2 | 3/2001 |
| WO | WO 01/15255 A2 | 3/2001 |

* cited by examiner

*Primary Examiner* — Patrick Ryan
*Assistant Examiner* — Sarah A Slifka
(74) *Attorney, Agent, or Firm* — Oblon, Spivak, McClelland, Maier & Neustadt, L.L.P.

(57) ABSTRACT

A membrane/electrode assembly 10 for a polymer electrolyte fuel cell, which comprises an anode 15 having an anode catalyst layer 11 containing an anode catalyst and an ion-exchange resin, a cathode 16 having a cathode catalyst layer 13 containing a cathode catalyst and an ion-exchange resin, and a polymer electrolyte membrane 17 disposed between the anode 15 and the cathode 16, wherein the anode catalyst is one having platinum or a platinum alloy supported on a carbon, and the amount of platinum or a platinum alloy supported in the anode catalyst is from 1 to 25 mass %; and the anode catalyst layer 11 contains fine particles made of at least one member selected from iridium oxide, iridium, ruthenium oxide and ruthenium, and the fine particles have a specific surface area of from 2 to 50 $m^2/g$.

20 Claims, 1 Drawing Sheet

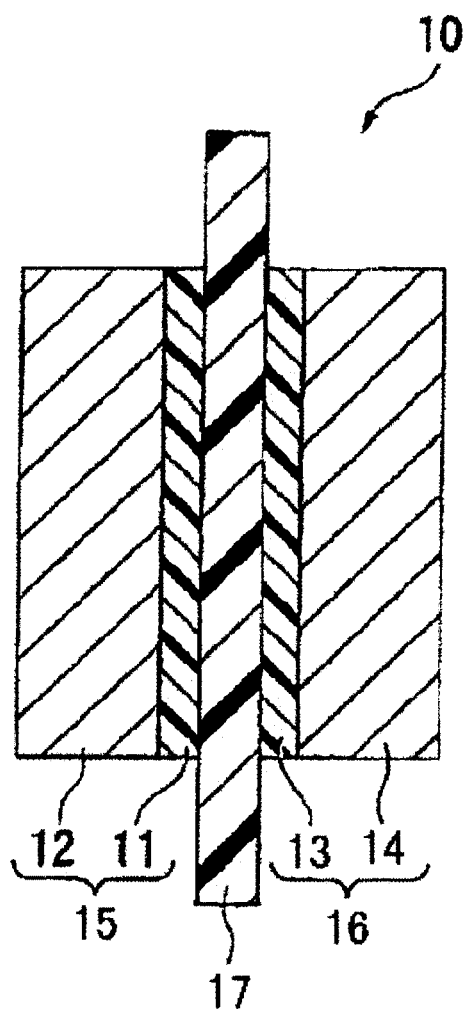

MEMBRANE/ELECTRODE ASSEMBLY FOR POLYMER ELECTROLYTE FUEL CELL AND PROCESS FOR PRODUCING MEMBRANE/ELECTRODE ASSEMBLY FOR POLYMER ELECTROLYTE FUEL CELL

BACKGROUND OF THE INVENTION

1. Field of the Invention

The present invention relates to a membrane/electrode assembly for a polymer electrolyte fuel cell and a process for producing a membrane/electrode assembly for a polymer electrolyte fuel cell.

2. Discussion of Background

A fuel cell using hydrogen and oxygen draws attention as a power generation system which has little adverse effect to an environment since its reaction product by an electrode reaction is only water in principle. Especially, with respect to a polymer electrolyte fuel cell using a proton conductive ion-exchange membrane as an electrolyte membrane, the operation temperature is low, the output density is high, and it is downsized, whereby it is expected to be prospective as automotive power source, etc.

The polymer electrolyte fuel cell has a feature that its operation temperature is low (50 to 120° C.). Because of this feature, however, it has a problem that it is difficult to effectively utilize exhaust heat for an auxiliary machine power, etc. With a view to overcoming such a problem as well, the polymer electrolyte fuel cell is required to have a high utilization of hydrogen and oxygen, namely, high energy efficiency and high output density.

In order to meet such a requirement, as an electrode catalyst to be contained in a catalyst layer of the polymer electrolyte fuel cell, an electrode catalyst is used wherein fine particles of catalyst metal such as platinum or a platinum alloy are supported as highly dispersed on a carbon having a large specific surface area. By using such an electrode catalyst, the reaction area in the electrode expands, and high output becomes possible.

Meanwhile, a fuel cell is operated by stacking many cells. Under such an operation condition, when a change in output occurs abruptly, a gas supply to stacked cells will be delayed. It is known that in such a situation, the supply of $H_2$ as a fuel gas to an anode becomes deficient, and the electrical potential of the anode increases, whereby a reverse voltage is caused. A usual anode reaction of a fuel cell is a reaction wherein protons are formed from $H_2$ as a fuel, as shown by the following formula (1).

$$H_2 \rightarrow 2H^+ + 2e^- \quad (1)$$

On the other hand, under a fuel deficient situation, at the anode, as a supply source of protons, an electrolysis reaction of water proceeds as shown by the following formula (2), to maintain the current.

$$2H_2O \rightarrow O_2 + 4H^+ + 4e^- \quad (2)$$

Further, in the situation where the above electrolysis reaction of water proceeds, if the fuel deficient state continues, a carbon corrosion reaction as shown by the following formula (3) will proceed.

$$2H_2O + C \rightarrow CO_2 + 4H^+ + 4e^- \quad (3)$$

If the reverse voltage continues for a long time, the subsequent power generation becomes difficult, thus leading to a fatal damage. As a method to overcome such a problem as a reverse voltage of the anode, for example, a technique of suppressing the carbon corrosion by increasing the supported ratio of a catalyst metal or using a carbon support having high corrosion resistance, is suggested (Patent Document 1). Further, by paying attention to the above formula (2), a technique to add a catalyst which can accelerate the electrolysis of water, to an anode catalyst layer, and so on, is suggested (Patent Document 2 and Patent Document 3).

Further, the polymer electrolyte fuel cell is required to have high power generation performance in an environment ranging from a low humidity to a high humidity. In a high humidity, there is a problem that an ion-exchange resin becomes swollen and blocks spaces in a catalyst layer, thus leading to a so-called flooding phenomenon. If the flooding phenomenon takes place, diffusion of gas to be supplied to the catalyst layer decreases, and the power generation performance of the polymer electrolyte fuel cell significantly decreases. Under a low humidity or no humidification operation condition, by hydrogen peroxide or peroxide radicals, deterioration of a polymer electrolyte membrane proceeds.

With a conventional technique, no membrane/electrode assembly for a polymer electrolyte fuel cell, which overcomes the above problem of the reverse voltage of the anode and has a high power generation performance in an environment ranging from a low humidity to a high humidity, was available, and its development was desired. Further, a technique to produce a membrane/electrode assembly for a polymer electrolyte fuel cell having such a performance without involving a complicated step, was desired.

Patent Document 1: WO01/15254
Patent Document 2: WO01/15247
Patent Document 3: WO01/15255

SUMMARY OF THE INVENTION

The present invention has been made in view of such problems, and an object of the present invention is to provide a membrane/electrode assembly for a polymer electrolyte fuel cell which has a high power generation performance in an environment ranging from a low humidity to a high humidity, and which is scarcely susceptible to deterioration in the performance of the electrode even when fuel becomes deficient. Further, another object of the present invention is to provide a process for producing a membrane/electrode assembly for a polymer electrolyte fuel cell, whereby such a membrane/electrode assembly for a polymer electrolyte fuel cell can easily be produced.

The membrane/electrode assembly for a polymer electrolyte fuel cell of the present invention, comprises an anode having a catalyst layer containing an anode catalyst and an ion-exchange resin, a cathode having a catalyst layer containing a cathode catalyst and an ion-exchange resin, and a polymer electrolyte membrane disposed between the anode and the cathode, wherein the anode catalyst is one having platinum or a platinum alloy supported on a carbon carrier, and the amount of platinum or a platinum alloy supported in the anode catalyst is from 1 to 25 mass %; and the anode catalyst layer contains fine particles made of at least one member selected from iridium oxide, iridium, ruthenium oxide and ruthenium, and the fine particles have a specific surface area of from 2 to 50 m²/g.

The process for producing a membrane/electrode assembly for a polymer electrolyte fuel cell of the present invention is a process for producing a membrane/electrode assembly for a polymer electrolyte fuel cell comprising an anode having a catalyst layer containing an anode catalyst and an ion-exchange resin, a cathode having a catalyst layer containing a cathode catalyst and an ion-exchange resin, and a polymer electrolyte membrane disposed between the anode and the cathode, wherein the anode catalyst layer is formed by using a coating liquid prepared by mixing the anode catalyst, fine particles and an ion-exchange resin; the anode catalyst is one having platinum or a platinum alloy supported on a carbon, and the amount of platinum or a platinum alloy supported in the anode catalyst is from 1 to 25 mass %; and the fine particles are made of at least one member selected from the group consisting of iridium oxide, iridium, ruthenium oxide and ruthenium and have a specific surface area of from 2 to 50 $m^2/g$.

The membrane/electrode assembly for a polymer electrolyte fuel cell of the present invention has a high power generation performance in an environment ranging from a low humidity to a high humidity, and is scarcely susceptible to deterioration in the performance of the electrode even when fuel becomes deficient.

By the process for producing a membrane/electrode assembly for a polymer electrolyte fuel cell of the present invention it is possible to easily produce a membrane/electrode assembly for a polymer electrolyte fuel cell which has a high power generation performance in an environment ranging from a low humidity to a high humidity, and which is scarcely susceptible to deterioration in the performance of the electrode even when fuel becomes deficient.

BRIEF DESCRIPTION OF THE DRAWING

FIG. 1 is a cross-sectional view illustrating an embodiment of the membrane/electrode assembly of the present invention.

In FIG. 1, reference numeral 10 represents a membrane/electrode assembly, 11 an anode catalyst layer, 12 an anode gas diffusion layer, 13 a cathode catalyst layer, 14 a cathode gas diffusion layer, 15 an anode, 16 a cathode, and 17 a polymer electrolyte membrane.

DETAILED DESCRIPTION OF THE PREFERRED EMBODIMENTS

In the present specification, a compound represented by the formula (1) is shown as a compound (1). The same applies to other compounds represented by other formula.
Membrane/Electrode Assembly for Polymer Electrolyte Fuel Cell FIG. 1 is a schematic cross-sectional view illustrating an embodiment of the membrane/electrode assembly for a polymer electrolyte fuel cell (hereinafter referred to as the membrane/electrode assembly) of the present invention. The membrane/electrode assembly 10 comprises an anode 15 having an anode catalyst layer 11 and an anode gas diffusion layer 12, a cathode 16 having a cathode catalyst layer 13 and a cathode gas diffusion layer 14, and a polymer electrolyte membrane 17 interposed between the anode 15 and the cathode 16 in a state of being contacted with the anode catalyst layer 11 and the cathode catalyst layer 13.
Anode Catalyst Layer The anode catalyst layer 11 contains an anode catalyst and an ion-exchange resin. The anode catalyst is an electrode catalyst having platinum or a platinum alloy supported on a carbon. In the present invention, the amount of platinum or a platinum alloy supported in the anode catalyst (100 mass %) is from 1 to 25 mass %. The amount of platinum or a platinum alloy supported in the anode catalyst (100 mass %) is preferably from 1 to 21 mass %, further preferably from 3 to 21 mass %. When the supported ratio of platinum or a platinum alloy is at least 1 mass %, it is possible to sufficiently carried out a reaction with hydrogen.

Further, by suppressing the thickness of the anode catalyst layer, non-uniform distribution of platinum or a platinum alloy in a thickness direction can be suppressed, whereby decrease of an output voltage can be suppressed. By adjusting the supported ratio to be at most 25 mass %, the particle size of platinum or a platinum alloy to be supported becomes small, and it is possible to increase an effective reaction area. Further, by lowering the amount of platinum or a platinum alloy to be used, the cost can be reduced.

The platinum alloy is preferably an alloy of platinum with at least one metal selected from the group consisting of platinum group metals other than platinum (e.g. ruthenium, rhodium, palladium, osmium and iridium), gold, silver, chrome, iron, titanium, manganese, cobalt, nickel, molybdenum, tungsten, aluminum, silicon, zinc and tin. The platinum alloy may contain an intermetallic compound of platinum with a metal to be alloyed with platinum.

In the present invention, one having platinum supported on a carbon carrier is preferred, whereby it is possible to sufficiently carry out a reaction with hydrogen and to further increase the output voltage.

The carbon support preferably has an average lattice spacing $d_{002}$ of [002] face of from 0.335 to 0.390 nm and a specific surface area of from 100 to 1,500 $m^2/g$. In the present invention, it is possible to use either a highly graphitized carbon support or a highly amorphous carbon support, but it is preferred to use a highly graphitized carbon support having $d_{002}$ of from 0.335 to 0.362 nm and a specific surface area of from 100 to 300 $m^2/g$, since the corrosion resistance of carbon is required particularly when fuel becomes deficient.

$d_{002}$ of the carbon support can be measured by using the X-ray powder diffractometer, wherein an electrode catalyst powder is set as a sample, and $d_{002}$ of the carbon support is calculated from its diffraction patterns. The specific surface area of the carbon support can be measured by nitrogen adsorption on the carbon surface by a BET specific surface area apparatus.

The anode catalyst layer 11 contains fine particles having a specific surface area of from 2 to 50 $m^2/g$, which are made of at least one member selected from the group consisting of iridium oxide, iridium, ruthenium oxide and ruthenium. Such a specific surface area of the fine particles made of at least one member selected from the group consisting of iridium oxide, iridium, ruthenium oxide and ruthenium, is preferably from 2 to 40 $m^2/g$, further preferably from 2 to 20 $m^2/g$.

As a method for measuring the specific surface area of the fine particles, generally, it is possible to use the BET adsorption method. This method is a method wherein molecules having a known adsorption area is adsorbed on a powder particle surface at liquid nitrogen temperature, and from the adsorbed amount, the specific surface area of the sample is obtained. The most commonly used one is a BET method by low temperature/low moisture physical adsorption of an inert gas. As the gas, nitrogen gas is used in many cases since the handling is easy.

Further, the fine particles made of at least one member selected from the group consisting of iridium oxide, iridium, ruthenium oxide and ruthenium, have an effect of the present invention even when they contain a certain amount of impurities or they form a hydrate.

With respect to iridium oxide, iridium, ruthenium oxide and ruthenium, in the case of oxides, functional groups such as -OH groups are formed on their surfaces, whereby they have extremely high affinity with water, and iridium and ruthenium are also metal materials, whereby they have extremely high affinity with water. By adjusting the surface area of the fine particles to be at least 2 $m^2/g$, it is possible to secure a reaction area which contributes to a water hydrolysis catalytic action of the fine particles, while keeping proper moisture, and deterioration of the polymer electrolyte membrane can be suppressed, whereby sufficient output voltage and sufficient fuel deficiency resistance can be obtained. Further, by adjusting the specific surface area of the fine particles to be at most 50 m$^2$/g, it is possible to suppress the formation of a flooding phenomenon by preventing the fine particles from taking too much water, whereby the power generation performance under a high humidity condition becomes good.

In the present invention, the anode catalyst is one having platinum or a platinum alloy supported on a carbon support, and since the amount of platinum or a platinum alloy supported in the anode catalyst is from 1 to 25 mass %, the ratio of the carbon support to the platinum or a platinum alloy is high as compared with a conventional technique. The carbon support is hydrophobic as compared with the above iridium oxide, iridium, ruthenium oxide or ruthenium, whereby it can suppress the formation of the flooding phenomenon.

In the membrane/electrode assembly 10 of the present invention, the amount of platinum or a platinum alloy to be supported is decreased to increase the ratio of the carbon support, whereby the hydrophobicity is provided to the anode catalyst layer 11, and the proper hydrophilicity and high water electrolysis catalytic action are provided by the fine particles having a specific surface area of from 2 to 50 m$^2$/g, whereby deterioration of the polymer electrolyte membrane in a low humidification operation is suppressed, and the flooding phenomenon in a high humidification operation is suppressed. Consequently, the power generation performance is increased in a range of from a low humidification operation to a high humidification operation, and it further has a characteristic such that deterioration in the performance of the electrode scarcely occurs even when fuel becomes deficient.

In the membrane/electrode assembly 10 of the present invention, the thickness of the anode catalyst layer 11 is from 1 to 30 μm, and the metal content (M) (mg/cm$^2$) as calculated as metal of the fine particles made of at least one member selected from iridium oxide, iridium, ruthenium oxide and ruthenium is preferably from 0.01 to 0.09 mg/cm$^2$, more preferably from 0.01 to 0.05 mg/cm$^2$. By adjusting the metal content to be in such a range, it is possible to further improve the power generation performance under an environment ranging from a low humidity to a high humidity, and it is possible to further prevent the deterioration in the performance of the electrode even when fuel becomes deficient. That is, by adjusting the thickness of the anode catalyst layer 11 to be from 1 to 30 μm, and the metal content (M) (mg/cm$^2$) of the fine particles as calculated as metal to be at least 0.01 mg/cm$^2$, moisture can be properly kept, and the deterioration of the anode catalyst layer 11 at the time of fuel deficiency can be further suppressed. Further, by adjusting the metal content to be at most 0.09 mg/cm$^2$, flooding can be suppressed by suppressing retention of water more than necessary due to a strong water retention performance of the fine particles, and the power generation performance under a high humidity condition can be further improved. Further, iridium oxide, iridium, ruthenium oxide or ruthenium to be used in the present invention, is rare, whereby it is possible to adjust the content to be at most 0.09 mg/cm$^2$ to reduce the cost.

By adjusting the thickness of the anode catalyst layer 11 to be at least 1 μm, the uniformity of the anode catalyst layer 11 can be increased, the homogenization of the reaction can further be increased, and the stable power generation performance can be obtained. As a result, it is simultaneously advantageous in a quality aspect as well. By adjusting the thickness of the anode catalyst layer 11 to be at most 30 μm, it is possible to shorten the distance where H$^+$ formed at the anode 15 transfers, whereby it is possible to further improve the power generation performance. Further, by suppressing the thickness, it is possible to suppress formation of cracklings on the anode catalyst layer 11, and it is possible to make a membrane/electrode assembly having a stable performance for a long period of time.

In the present invention, the ratio (C)/(M) of the content (C) (mg/cm$^2$) of the carbon support in the anode catalyst to the metal content (M) (mg/cm$^2$) as calculated as metal of the fine particles is preferably from 30/1 to 2/1. By adjusting (C)/(M) to be at least 30/1, it is possible to make the water electrolysis catalytic action further more effective, and it is possible to further increase the fuel deficiency resistance. Further, by adjusting (C)/(M) to be at most 2/1, it is possible to further improve the power generation performance under a high humidity condition by suppressing retention of water more than necessary due to a strong water retention performance of the fine particles.

The ion-exchange resin may be a fluoropolymer or a hydrocarbon polymer, and from the viewpoint of durability, the fluoropolymer is preferred.

The fluoropolymer is preferably a perfluorocarbon polymer (which may contain an etheric oxygen atom), particularly preferably a copolymer containing repeating units based on tetrafluoroethylene and repeating units based on a perfluorovinyl ether having a sulfonic group.

A monomer to form repeating units based on a perfluorovinyl ether having a sulfonic group, is preferably the compound (1):

$$CF_2=CF(OCF_2CFX)_m-O_p-(CF_2)_n-SO_2F \quad (1)$$

wherein m is an integer of from 0 to 3, n is an integer of from 1 to 12, p is 0 or 1, and X is F or CF$_3$.

As the compound (1), compounds (1-1) to (1-3) are preferred:

$$CF_2=CFO(CF_2)_qSO_2F \quad (1-1)$$

$$CF_2=CFOCF_2CF(CF_3)O(CF_2)_rSO_2F \quad (1-2)$$

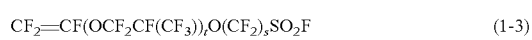

$$CF_2=CF(OCF_2CF(CF_3))_tO(CF_2)_sSO_2F \quad (1-3)$$

wherein each of q, r and s is an integer of from 1 to 8, and t is an integer of from 1 to 3. Further, a —SO$_2$F group is converted to a sulfonic group by hydrolysis or conversion to acid form after polymerization.

In the case of a perfluorocarbon polymer having a sulfonic group, it may be one having the polymer terminal fluorinated by fluorination after polymerization. When the terminal of the polymer is fluorinated, stability against hydrogen peroxide or radical peroxide is good, whereby the durability increases.

The hydrocarbon polymer may, for example, be sulfonated polyarylene, sulfonated polybenzooxazole, sulfonated polybenzothiazole, sulfonated polybenzoimidazole, sulfonated polysulfone, sulfonated polyether sulfone, sulfonated polyether ether sulfone, sulfonated polyphenylene sulfone, sulfonated polyphenylene oxide, sulfonated polyphenylene sulfoxide, sulfonated polyphenylene sulfide, sulfonated polyphenylene sulfide sulfone, sulfonated polyether ketone, sulfonated polyether ether ketone, sulfonated polyether ketone ketone or sulfonated polyimide.

The ion-exchange capacity of the ion-exchange resin is preferably from 0.5 to 2.0 meq/g dry resin, particularly preferably from 0.8 to 1.5 meq/g dry resin, from the viewpoint of conductivity and gas permeability.

Cathode Catalyst Layer

A cathode catalyst layer 13 contains a cathode catalyst and an ion-exchange resin. As the cathode catalyst, a cathode catalyst having platinum or a platinum alloy supported on a carbon, is used. As the carbon support, it is possible to use common carbon black having a specific surface area of from 100 to 1,000 $m^2/g$.

As the platinum or the platinum alloy, it is possible to use the platinum or the platinum alloy, which can be used for the anode catalyst layer 11.

As the ion-exchange resin, it is possible to use the ion-exchange resin which can be used for the anode catalyst layer 11.

Further, the proportion of a catalyst metal supported in the cathode catalyst to be used for the cathode catalyst layer 13, is preferably from 1 to 40% higher than the proportion of metal supported in the anode catalyst. The reaction at the cathode is a reduction reaction of oxygen, and such a reaction hardly takes place, and overvoltage is high whereby it is usually possible to increase the cell voltage by using a larger amount than the amount of platinum used as a catalyst for the anode. Thus, the proportion of metal supported in the cathode catalyst to be used for the cathode catalyst layer 13, is preferably be higher than the proportion of metal supported in the anode catalyst to be used for the anode catalyst layer 11.

Gas Diffusion Layer

As an anode gas diffusion layer 12 or a cathode gas diffusion layer 14, it is possible to use e.g. carbon cloth, carbon paper or carbon felt. The anode gas diffusion layer 12 and the cathode gas diffusion layer 14 are preferably treated for water repellency with polytetrafluoroethylene, etc.

Polymer Electrolyte Membrane

The polymer electrolyte membrane 17 may be an ion-exchange resin. As the ion-exchange resin, it is possible to use the ion-exchange resin which can be used for the anode catalyst layer 11 or the cathode catalyst layer 13.

Process for Producing Membrane/Electrode Assembly

In the process for producing a membrane/electrode assembly of the present invention, a coating liquid containing the anode catalyst, fine particles made of at least one member selected from the group consisting of iridium oxide, iridium, ruthenium oxide and ruthenium, and an ion-exchange resin, is prepared, and by using the coating liquid, the anode catalyst layer 11 is formed. Instead of having a material made of at least one member selected from the group consisting of iridium oxide, iridium, ruthenium oxide and ruthenium, supported on a carbon of the anode catalyst, by a method of mixing the material in a state of fine particles having the specific surface area of from 2 to 50 $m^2/g$ in the coating liquid, a supporting step can be omitted. Consequently, a membrane/electrode assembly can easily be produced, and it is possible to reduce the production cost. The anode catalyst layer 11 and the cathode catalyst layer 13 can be formed by applying the coating liquid on a substrate. As the substrate, a polymer film, a polymer electrolyte membrane 17, an anode gas diffusion layer 12 or a cathode gas diffusion layer 14 is used. The polymer film may be a film sheet of e.g. polypropylene, polyethylene terephthalate, a ethylene/tetrafluoroethylene copolymer or polytetrafluoroethylene.

When the polymer film is used as a substrate, after the anode catalyst layer 11 formed on the substrate is transferred to the polymer electrolyte membrane 17 by hot press, etc., the polymer film is removed, and the anode catalyst layer 11 and the anode gas diffusion layer 12 are bonded to each other. Further, after the cathode catalyst layer 13 formed on the substrate is transferred to the other side of the polymer electrolyte membrane 17 by hot press, etc., the polymer film is removed, and the cathode catalyst layer 13 and the cathode gas diffusion layer 14 are bonded to each other, whereby a membrane/electrode assembly 10 is obtained.

Further, after the anode catalyst layer 11 formed on the substrate is transferred to a surface of the anode gas diffusion layer 12 by hot press, etc., the polymer film is removed, followed by bonding to the polymer electrolyte membrane 17. Furthermore, after the cathode catalyst layer 13 is transferred to a surface of the cathode gas diffusion layer 14 by hot press, etc., the polymer film is removed, followed by bonding to the polymer electrolyte membrane 17, whereby the membrane/electrode assembly 10 is obtained.

When the polymer electrolyte membrane 17 is used as a substrate, the membrane/electrode assembly 10 is obtained by bonding the anode gas diffusion layer 12 and the cathode gas diffusion layer 14 to the anode catalyst layer 11 and the cathode catalyst layer 13, which are formed on the polymer electrolyte membrane 17.

When the anode gas diffusion layer 12 and the cathode gas diffusion layer 14 are used as substrates, the membrane/electrode assembly 10 is obtained by bonding the anode catalyst layer 11 formed on the anode gas diffusion layer 12, and the cathode catalyst layer 13 formed on the cathode gas diffusion layer 14, to the polymer electrolyte membrane 17.

Further, the membrane/electrode assembly is obtained in such a manner that a coating liquid is applied on the polymer film to form the anode catalyst layer 11; a polymer solution for forming a polymer electrolyte membrane is applied thereon to form the polymer electrolyte membrane 17; a coating liquid is further applied on the polymer electrolyte membrane 17 to form the cathode catalyst layer 13; and then, the anode gas diffusion layer 12 and the cathode gas diffusion layer 14 are bonded to the anode catalyst layer 11 and the cathode catalyst layer 13.

The solvent of the coating liquid may, for example, be water, acetone, an alcohol such as ethanol, n-propanol, isopropanol, n-butanol, isobutanol, n-pentanol, ethylene glycol, pentafluoroethanol or heptafluorobutanol, or a solvent mixture thereof.

To the coating liquid, it is possible to add a water repellent, a pore-forming agent, a thickener, a diluting solvent, etc., as the case requires for the purpose of increasing the dischargeability of water to be formed by an electrode reaction, maintaining the shape stability of the catalyst layer itself, avoiding non-uniformity of coating or increasing the coating stability.

The coating liquid may be subjected to a dispersion treatment as the case requires for improving the coating stability. The dispersion treatment may, for example, be ball mill pulverization, homogenizer pulverization, planetary mill pulverization or ultrasonic wave pulverization.

The coating method may, for example, be a method of using e.g. an applicator, a bar coater or a die coater; a screen printing method or gravure printing method. After the coating liquid is applied on the substrate, it is dried to form a catalyst layer. The drying temperature for the coated film is preferably from 60 to 100° C.

On the both sides of the membrane/electrode assembly 10 produced by such a manner, separators having a trench for a gas flow path formed, are placed to obtain a polymer electrolyte fuel cell. The separator may be a separator made of various conductive materials such as a metal separator, a carbon separator or a separator made of a material having graphite and a resin mixed.

In the polymer electrolyte fuel cell, by supplying a gas containing oxygen to the cathode and a gas containing hydrogen to the anode, power generation is carried out.

In the present invention, fibrous carbon may be mixed in the anode catalyst layer 11 and the cathode catalyst layer 13. That is, even when an oxidation reaction of the carbon support proceeds and a carbon corrosion reaction accordingly proceeds, under a high potential condition at the cathode 16, and platinum or a platinum alloy becomes free in the ion-exchange resin, the platinum or the platinum alloy is in contact with fibrous carbon having electron conductivity, whereby an electrode reaction can be carried out, and a high voltage can be maintained for a long period of time. Further, the fibrous carbon has usually a high graphitization degree, whereby it is excellent in the oxidation corrosion resistance.

Also at the anode 15, when supply of hydrogen is becomes insufficient, the oxidation reaction of the carbon support may take place, instead of the oxidation reaction of hydrogen, in order to maintain a prescribed current density. In the present invention, by mixing fibrous carbon in the anode catalyst layer 11 in the same manner as in the cathode 16, the same effect as of the above cathode 16 can be obtained.

EXAMPLES

Now, the present invention will be described in further detail with reference to Examples, but the present invention is by no means restricted by the following Examples. Examples 1, 7, 12 and 13 are Comparative Examples, and Examples 2 to 6, Examples 8 to 11 and Examples 14 to 16 are Examples of the present invention.

Example 1

I. Process for Producing Membrane/Electrode Assembly (1)
Formation of Anode Catalyst Layer (1)

A powder of carbon carrier ($d_{002}$ 0.339 nm, specific surface area: 210 $m^2/g$) was dispersed in deionized water, followed by addition of a chloroplatinic acid aqueous solution and formaline, and the mixture was cooled to −10° C., followed by stirring. After the resultant was kept at −10° C. for 30 minutes, a 40% sodium hydroxide aqueous solution was slowly dropwise-added therein, and the mixture was refluxed and stirred for 1 hour, followed is by filtration.

Then, the washing operation was repeated by using deionized water until the pH of the filtrate became 7. after that, the resultant was dried at 80° C., followed by vacuum drying overnight to prepare an electrode catalyst having 20 mass % of platinum supported on carbon. Such an electrode catalyst was measured by the X-ray powder diffraction, and the particle size of the platinum was about 2.5 nm. 6.0 g of an anode catalyst having platinum supported (amount of platinum supported: 20 mass %) therein was added to 76.6 g of distilled water, followed by thorough stirring. Further, 12.0 g of ethanol was added thereto, followed by thorough stirring. Moreover, 0.62 g of iridium oxide hydrate ($IrO_x \cdot (H_2O)_y$, Ir metal content: 76.2%) was added thereto. Then, further, into the mixture, 31.6 g of a liquid having a solid concentration of 9 mass %, wherein a copolymer (copolymer (A)) comprising units based on tetrafluoroethylene and units based on $CF_2=CFOCF(CF_3)O(CF_2)_2SO_3H$ and having an ion exchange capacity of 1.1 meq/g dry resin, was dispersed in ethanol (hereinafter referred to as an ethanol dispersion of a copolymer (A)), was added, followed by mixing and pulverizing by using an ultrasonic dispersion apparatus to prepare a coating liquid (a)-1.

The specific surface area of fine particles of iridium oxide hydrate contained in the coating liquid (a)-1 was measured by the BET method, and it was 1.5 $m^2/g$. The coating liquid (a)-1 was applied on a polypropylene substrate film by a die coater, followed by drying for 10 minutes in a dryer at 80° C. to form an anode catalyst layer (1).

The platinum amount per unit area, contained in the anode catalyst layer (1) was calculated by measuring the mass of the substrate film itself before forming the anode catalyst layer (1) and the mass of the anode catalyst layer (1) and the substrate film after forming the anode catalyst layer (1), and it was 0.1 $mg/cm^2$. The thickness of the anode catalyst layer (1) was 8 μm, and the iridium metal amount (M) ($mg/cm^2$) in the iridium oxide hydrate of the anode catalyst layer (1) was 0.04 $mg/cm^2$. Further, the ratio (C)/(M) of the carbon carrier (C) ($mg/cm^2$) in the electrode catalyst and the iridium metal amount (M) ($mg/cm^2$) in iridium oxide hydrate was 10/1.

Formation of Cathode Catalyst Layer (1)

18.0 g of a catalyst having platinum-cobalt alloy (amount of platinum/cobalt alloy supported: 42 mass %) supported on a carbon ($d_{002}$ 0.339 nm, specific surface area: 210 $m^2/g$), was added to 94.2 g of distilled water, followed by thorough stirring. Further, 12.0 g of ethanol was added thereto, followed by thorough stirring. Moreover, 92.7 g of the ethanol dispersion of a copolymer (A) was added thereto, followed by mixing and pulverizing by using an ultrasonic dispersion apparatus to prepare a coating liquid (b).

The coating liquid (b) was applied on a polypropylene substrate film by a die coater, followed by drying for 10 minutes in a dryer at 80° C. to form a cathode catalyst layer (1). The platinum amount per unit area, contained in the cathode catalyst layer (1) was calculated by measuring the mass of the substrate film itself before forming the cathode catalyst layer (1) and the mass of the cathode catalyst layer (1) and the substrate film after forming the cathode catalyst layer (1), and it was 0.4 $mg/cm^2$. The thickness of the cathode catalyst layer (1) was 16 μm.

Production of Membrane/Electrode Assembly (1)

As a polymer electrolyte membrane, an ion exchange membrane made of a perfluorocarbon polymer having a sulfonic group and having a thickness of 30 μm (ion exchange capacity: 1.1 meq/g dry resin, a copolymer comprising units based on tetrafluoroethylene and units based on $CF_2=CFOCF(CF_3)O(CF_2)_2SO_3H$) was prepared.

The anode catalyst layer (1) formed on the substrate film was placed to be in contact with one side of the polymer electrolyte membrane, and the cathode catalyst layer (1) formed on the substrate film was placed to be in contact with the other side of the polymer electrolyte membrane. The laminated body was pressed by a hot pressing method to transfer the catalyst layers to the polymer electrolyte membrane, and then, each substrate film was removed to obtain a membrane/catalyst layer assembly comprising the polymer electrolyte membrane, the anode catalyst layer (1) and the cathode catalyst layer (1), and having an electrode area of 25 $cm^2$. Further, such a membrane/catalyst layer assembly was sandwiched with two gas diffusion layers made of a carbon paper having a thickness of 250 μm to obtain a membrane/electrode assembly (1).

II. Evaluation of Performance of Membrane/Electrode Assembly (1)
Initial Performance Evaluation The membrane/electrode assembly (1) was mounted on a cell for power generation. At normal pressure, hydrogen (utilization: 70%)/air (utilization: 40%) was supplied thereto, and at a cell temperature of 80° C., the initial cell voltage at a current density of 1.0 $A/cm^2$, was measured. At that time, hydrogen having a dew point of 80° C. was supplied to the anode side, and air having a dew point of 80° C. was supplied to the cathode side. The evaluation results are shown in Table 2.

Further, in order to evaluate the cell power generation performance under a condition ranging from a low humidification to a high humidification, while the cell temperature was kept at 80° C., the initial cell voltage (V) at a current density of 1 A/cm$^2$ was measured in a case where hydrogen having a dew point of 50° C. was supplied to the anode side, and air having a dew point of 80° C. was supplied to the cathode side, and a case where hydrogen having a dew point of 80° C. was supplied to the anode side, and air having a dew point of 50° C. was supplied to the cathode side, as a cell humidity condition. The evaluation results are shown in Table 2.

Evaluation of Fuel Deficient Resistance

The membrane/electrode assembly (1) was mounted on a cell for power generation. At normal pressure, hydrogen (utilization: 70%)/air (utilization: 40%) was supplied, and at a cell temperature of 80° C., the initial cell voltage (the initial output voltage) at a current density of 1.0 A/cm$^2$ was measured. At that time, hydrogen having a dew point of 80° C. was supplied to the anode side, and air having a dew point of 80° C. was supplied to the cathode side. Then, regarding only the anode side, gas to be supplied was changed from hydrogen to nitrogen to make the anode side a fuel deficient state, and such a state was kept for 30 minutes. After that, the gas to be supplied to the anode side was set back as hydrogen from nitrogen, and after 30 minutes, the cell voltage (the voltage after a fuel deficient resistance test) at a current density of 1.0 A/cm$^2$ was measured. The initial output voltage (V), the voltage (V) after a fuel deficient resistance test and the difference ΔV (V) between the initial output voltage and the voltage after a fuel deficient resistance test are shown in Table 3.

Example 2

I. Process for Producing Membrane/Electrode Assembly (2)

A coating liquid (a)-2 was prepared in the same manner as in the process for producing the coating liquid (a)-1 of Example 1 except that the amount of iridium oxide hydrate (IrO$_x$.(H$_2$O)$_y$, Ir metal content: 76.2%) having a specific surface area of 8.0 m$^2$/g by a BET measuring method, added, was changed to 0.30 g.

The coating liquid (a)-2 was applied on a polypropylene substrate film by a die coater, followed by drying for 10 minutes in a dryer at 80° C. to form an anode catalyst layer (2). The thickness of the anode catalyst layer (2), the iridium metal amount (M) (mg/cm$^2$) in the iridium oxide hydrate and the ratio (C)/(M) of the carbon support (C) (mg/cm$^2$) in the electrode catalyst and the iridium metal amount (M) (mg/cm$^2$) in the iridium oxide hydrate are shown in Table 1.

A membrane/electrode assembly (2) was obtained in the same manner as in the process for producing the membrane/electrode assembly (1) of Example 1, except that the anode catalyst layer (1) was changed to the anode catalyst layer (2).

II. Evaluation of Performance of Membrane/Electrode Assembly (2)

Evaluation of the initial performance and the fuel deficient resistance of the membrane/electrode assembly, when the humidity condition of the membrane/electrode assembly (2) was changed, was carried out in the same manner as in Example 1. The evaluation results are shown in Tables 2 and 3.

Example 3

I. Process of Producing Membrane/Electrode Assembly (3)

A coating liquid (a)-3 was prepared in the same manner as in the process for producing the coating liquid (a)-1 of Example 1, except that the coating liquid was prepared by using fine particles of iridium oxide hydrate, having a specific surface area of 10 m$^2$/g by the BET method.

The coating liquid (a)-3 was applied on a polypropylene substrate film by a die coater, followed by drying for 10 minutes in a dryer at 80° C. to form an anode catalyst layer (3). The thickness of the anode catalyst layer (3), the iridium metal amount (M) (mg/cm$^2$) in the iridium oxide hydrate and the ratio (C)/(M) of the carbon support (C) (mg/cm$^2$) in the electrode catalyst and the iridium metal amount (M) (mg/cm$^2$) in the iridium oxide hydrate are shown in Table 1.

A membrane/electrode assembly (3) was obtained in the same manner as in the process for producing the membrane/electrode assembly (1) of Example 1, except that the anode catalyst layer (1) was changed to the anode catalyst layer (3).

II. Evaluation of Performance of Membrane/Electrode Assembly (3)

Evaluation of the initial performance and the fuel deficient resistance of the membrane/electrode assembly, when the humidity condition of the membrane/electrode assembly (3) was changed, was carried out in the same manner as in Example 1. The evaluation results are shown in Tables 2 and 3.

Example 4

I. Process for Producing Membrane/Electrode Assembly (4)

A coating liquid (a)-4 was prepared in the same manner as in the process for producing the coating liquid (a)-1 of Example 1 except that the coating liquid was prepared by changing the amount of iridium oxide hydrate (IrO$_x$.(H$_2$O)$_y$, Ir metal content: 76.2%) having a specific surface area of 10 m$^2$/g by the BET method, added, to 0.31 g.

The coating liquid (a)-4 was applied on a polypropylene substrate film by a die coater, followed by drying for 10 minutes in a dryer at 80° C. to form an anode catalyst layer (4).

The thickness of the anode catalyst layer (4), the iridium metal amount (M) (mg/cm$^2$) in the iridium oxide hydrate and the ratio (C)/(M) of the carbon support (C) (mg/cm$^2$) in the electrode catalyst to the iridium metal amount (M) (mg/cm$^2$) in the iridium oxide hydrate, are shown in Table 1.

A membrane/electrode assembly (4) was obtained in the same manner as in the process for producing the membrane/electrode assembly (1) of Example 1 except that the anode catalyst layer (1) was changed to the anode catalyst layer (4).

II. Evaluation of Performance of Membrane/Electrode Assembly (4)

Evaluation of the initial performance and the fuel deficient resistance of the membrane/electrode assembly, when the humidity condition of the membrane/electrode assembly (4) was changed, was carried out in the same manner as in Example 1. The evaluation results are shown in Tables 2 and 3.

Example 5

I. Process for Producing Membrane/Electrode Assembly (5)

A coating liquid (a)-5 was prepared in the same manner as in the process for producing the coating liquid (a)-1 of Example 1, except that the coating liquid was prepared by changing the amount of iridium oxide hydrate (IrO$_x$.(H$_2$O)$_y$, Ir metal content: 76.2%) having a specific surface area of 10 m$^2$/g by a BET method, added, to 1.24 g.

The coating liquid (a)-5 was applied on a polypropylene substrate film by a die coater, followed by drying for 10 minutes in a dryer at 80° C. to form an anode catalyst layer (5).

The thickness of the anode catalyst layer (5), the iridium metal amount (M) (mg/cm$^2$) in the iridium oxide hydrate and the ratio (C)/(M) of the carbon support (C) (mg/cm$^2$) in the electrode catalyst to the iridium metal amount (M) (mg/cm$^2$) in the iridium oxide hydrate, are shown in Table 1.

A membrane/electrode assembly (5) was obtained in the same manner as in the process for producing the membrane/electrode assembly (1) of Example 1, except that the anode catalyst layer (1) was changed to the anode catalyst layer (5).

II. Evaluation of Performance of Membrane/Electrode Assembly (5)

Evaluation of the initial performance and the fuel deficient resistance of the membrane/electrode assembly, when the humidity condition of the membrane/electrode assembly (5) was changed, was carried out in the same manner as in Example 1. The evaluation results are shown in Tables 2 and 3.

Example 6

I. Process for Producing Membrane/Electrode Assembly (6)

A coating liquid (a)-6 was prepared in the same manner as in the process for producing the coating liquid (a)-1 of Example 1, except that the coating liquid was prepared by changing the amount of iridium oxide hydrate (IrO$_x$·(H$_2$O)$_y$, Ir metal content: 76.2%) having a specific surface area of 10 m$^2$/g by the BET method, added, to 0.97 g.

The coating liquid (a)-6 was applied on a polypropylene substrate film by a die coater, followed by drying for 10 minutes in a dryer at 80° C. to form an anode catalyst layer (6).

The thickness of the anode catalyst layer (6), the iridium metal amount (M) (mg/cm$^2$) in the iridium oxide hydrate and the ratio (C)/(M) of the carbon support (C) (mg/cm$^2$) in the electrode catalyst to the iridium metal amount (M) (mg/cm$^2$) in the iridium oxide hydrate, are shown in Table 1.

A membrane/electrode assembly (6) was obtained in the same manner as in the process for producing the membrane/electrode assembly (1) of Example 1, except that the anode catalyst layer (1) was changed to the anode catalyst layer (6).

II. Evaluation of Performance of Membrane/Electrode Assembly (6)

Evaluation of the initial performance and the fuel deficient resistance of the membrane/electrode assembly, when the humidity condition of the membrane/electrode assembly (6) was changed, was carried out in the same manner as in Example 1. The evaluation results are shown in Tables 2 and 3.

Example 7

I. Process for Producing Membrane/Electrode Assembly (7)

A coating liquid (a)-7 was prepared in the same manner as in the process for producing the coating liquid (a)-1 of Example 1, except that the coating liquid was prepared by using fine particles of iridium oxide hydrate having a specific surface area of 55 m$^2$/g by the BET method.

The coating liquid (a)-7 was applied on the polypropylene substrate film by a die coater, followed by drying for 10 minutes in a dryer at 80° C. to form an anode catalyst layer (7).

The thickness of the anode catalyst layer (7), the iridium metal amount (M) (mg/cm$^2$) in the iridium oxide hydrate and the ratio (C)/(M) of the carbon support (C) (mg/cm$^2$) in the electrode catalyst to the iridium metal amount (M) (mg/cm$^2$) in the iridium oxide hydrate, are shown in Table 1.

A membrane/electrode assembly (7) was obtained in the same manner as in the process for producing the membrane/electrode assembly (1) of Example 1, except that the anode catalyst layer (1) was changed to the anode catalyst layer (7).

II. Evaluation of Performance of Membrane/Electrode Assembly (7)

Evaluation of the initial performance and the fuel deficient resistance of the membrane/electrode assembly, when the humidity condition of the membrane/electrode assembly (7) was changed, was carried out in the same manner as in Example 1. The evaluation results are shown in Tables 2 and 3.

Example 8

I. Process for Producing Membrane/Electrode Assembly (8)

A coating liquid (a)-8 was prepared in the same manner as in the process for producing the coating liquid (a)-1 of Example 1, except that the coating liquid was prepared by using fine particles of iridium oxide hydrate having a specific surface area of 3 m$^2$/g by the BET method.

The coating liquid (a)-8 was applied on the polypropylene substrate film by a die coater, followed by drying for 10 minutes in a dryer at 80° C. to form an anode catalyst layer (8).

The thickness of the anode catalyst layer (8), the iridium metal amount (M) (mg/cm$^2$) in the iridium oxide hydrate and the ratio (C)/(M) of the carbon support (C) (mg/cm$^2$) in the electrode catalyst to the iridium metal amount (M) (mg/cm$^2$) in the iridium oxide hydrate, are shown in Table 1.

A membrane/electrode assembly (8) was obtained in the same manner as in the process for producing the membrane/electrode assembly (1) of Example 1, except that the anode catalyst layer (1) was changed to the anode catalyst layer (8).

II. Evaluation of Performance of Membrane/Electrode Assembly (8)

Evaluation of the initial performance and the fuel deficient resistance of the membrane/electrode assembly, when the humidity condition of the membrane/electrode assembly (8) was changed, was carried out in the same manner as in Example 1. The evaluation results are shown in Tables 2 and 3.

Example 9

I. Process for Producing Membrane/Electrode Assembly (9)

A coating liquid (a)-9 was prepared in the same manner as in the process for producing the coating liquid (a)-1 of Example 1, except that the coating liquid was prepared by using fine particles of iridium oxide hydrate having a specific surface area of 48 m$^2$/g by the BET method.

The coating liquid (a)-9 was applied on the polypropylene substrate film by a die coater, followed by drying for 10 minutes in a dryer at 80° C. to form an anode catalyst layer (9).

The thickness of the anode catalyst layer (9), the iridium metal amount (M) (mg/cm$^2$) in the iridium oxide hydrate and the ratio (C)/(M) of the carbon support (C) (mg/cm$^2$) in the electrode catalyst to the iridium metal amount (M) (mg/cm$^2$) in the iridium oxide hydrate, are shown in Table 1.

A membrane/electrode assembly (9) was obtained in the same manner as in the process for producing the membrane/ electrode assembly (1) of Example 1, except that the anode catalyst layer (1) was changed to the anode catalyst layer (9).

II. Evaluation of Performance of Membrane/Electrode Assembly (9)

Evaluation of the initial performance and the fuel deficient resistance of the membrane/electrode assembly, when the humidity condition of the membrane/electrode assembly (9) was changed, was carried out in the same manner as in Example 1. The evaluation results are shown in Tables 2 and 3.

Example 10

I. Process for Producing Membrane/Electrode Assembly (10)

An electrode catalyst having 5 mass % of platinum supported on a carbon carrier ($d_{002}$ 0.339 nm, specific surface area: 210 m$^2$/g), was prepared in the same manner as in the process for producing the electrode catalyst having platinum supported thereon, of Example 1, by changing the amount of chloroplatinic acid aqueous solution added. Such an electrode catalyst was measured by the X-ray powder diffraction, and the particle size of the platinum was about 2.5 nm.

A coating liquid (a)-10 was prepared in the same manner as in the process for producing the coating liquid (a)-1 of Example 1, except that the coating liquid was prepared by using 5.1 g of a catalyst having platinum supported (amount of platinum supported: 5 mass %) on a carbon ($d_{002}$ 0.339 nm, specific surface area: 210 m$^2$/g) and using fine particles of iridium oxide hydrate having a specific surface area of 10 m$^2$/g by the BET method.

The coating liquid (a)-10 was applied on the polypropylene substrate film by a die coater, followed by drying for 10 minutes in a dryer at 80° C. to form an anode catalyst layer (10).

The thickness of the anode catalyst layer (10), the iridium metal amount (M) (mg/cm$^2$) in the iridium oxide hydrate and the ratio (C)/(M) of the carbon support (C) (mg/cm$^2$) in the electrode catalyst to the iridium metal amount (M) (mg/cm$^2$) in the iridium oxide hydrate, are shown in Table 1.

A membrane/electrode assembly (10) was obtained in the same manner as in the process for producing the membrane/electrode assembly (1) of Example 1, except that the anode catalyst layer (1) was changed to the anode catalyst layer (10).

II. Evaluation of Performance of Membrane/Electrode Assembly (10)

Evaluation of the initial performance and the fuel deficient resistance of the membrane/electrode assembly, when the humidity condition of the membrane/electrode assembly (10) was changed, was carried out in the same manner as in Example 1. The evaluation results are shown in Tables 2 and 3.

Example 11

I. Process for Producing Membrane/Electrode Assembly (11)

An electrode catalyst having 10 mass % of platinum supported on a carbon ($d_{002}$ 0.339 nm, specific surface area: 210 m$^2$/g), was prepared in the same manner as in the process for producing the electrode catalyst having platinum supported thereon, of Example 1, by changing the amount of chloroplatinic acid aqueous solution added. Such an electrode catalyst was measured by the X-ray powder diffraction, and the particle size of platinum was about 2.3 nm.

A coating liquid (a)-11 was prepared in the same manner as in the process for producing the coating liquid (a)-1 of Example 1, except that the coating liquid was prepared by using 5.4 g of a catalyst having platinum supported (amount of platinum supported: 10 mass %) on a carbon ($d_{002}$ 0.339 nm, specific surface area: 210 m$^2$/g) and using fine particles of iridium oxide hydrate having a specific surface area of 10 m$^2$/g by the BET method.

The coating liquid (a)-11 was applied on the polypropylene substrate film by a die coater, followed by drying for 10 minutes in a dryer at 80° C. to form an anode catalyst layer (11).

The thickness of the anode catalyst layer (11), the iridium metal amount (M) (mg/cm$^2$) in the iridium oxide hydrate and the ratio (C)/(M) of the carbon support (C) (mg/cm$^2$) in the electrode catalyst to the iridium metal amount (M) (mg/cm$^2$) in the iridium oxide hydrate, are shown in Table 1.

A membrane/electrode assembly (11) was obtained in the same manner as in the process for producing the membrane/electrode assembly (1) of Example 1, except that the anode catalyst layer (1) was changed to the anode catalyst layer (11).

II. Evaluation of Performance of Membrane/Electrode Assembly (11)

Evaluation of the initial performance and the fuel deficient resistance of the membrane/electrode assembly, when the humidity condition of the membrane/electrode assembly (11) was changed, was carried out in the same manner as in Example 1. The evaluation results are shown in Tables 2 and 3.

Example 12

I. Process for Producing Membrane/Electrode Assembly (12)

An electrode catalyst having 30 mass % of platinum supported on a carbon ($d_{002}$ 0.339 nm, specific surface area: 210 m$^2$/g), was prepared in the same manner as in the process for producing the electrode catalyst having platinum supported thereon, of Example 1, by changing the amount of chloroplatinic acid aqueous solution added. Such an electrode catalyst was measured by the X-ray powder diffraction, and the particle size of platinum was about 2.7 nm.

A coating liquid (a)-12 was prepared in the same manner as in the process for producing the coating liquid (a)-1 of Example 1, except that the coating liquid was prepared by using 6.0 g of a catalyst having platinum supported (amount of platinum supported: 30 mass %) on a carbon ($d_{002}$ 0.339 nm, specific surface area: 210 m$^2$/g) and using fine particles of iridium oxide hydrate having a specific surface area of 10 m$^2$/g by the BET method.

The coating liquid (a)-12 was applied on the polypropylene substrate film by a die coater, followed by drying for 10 minutes in a dryer at 80° C. to form an anode catalyst layer (12).

The thickness of the anode catalyst layer (12), the iridium metal amount (M) (mg/cm$^2$) in the iridium oxide hydrate and the ratio (C)/(M) of the carbon support (C) (mg/cm$^2$) in the electrode catalyst to the iridium metal amount (M) (mg/cm$^2$) in the iridium oxide hydrate, are shown in Table 1.

A membrane/electrode assembly (12) was obtained in the same manner as in the process for producing the membrane/electrode assembly (1) of Example 1, except that the anode catalyst layer (1) was changed to the anode catalyst layer (12).

II. Evaluation of Performance of Membrane/Electrode Assembly (12)

Evaluation of the initial performance and the fuel deficient resistance of the membrane/electrode assembly, when the humidity condition of the membrane/electrode assembly (12) was changed, was carried out in the same manner as in Example 1. The evaluation results are shown in Tables 2 and 3.

Example 13

I. Process for Producing Membrane/Electrode Assembly (13)

An electrode catalyst having 0.5 mass % of platinum supported on a carbon ($d_{002}$ 0.339 nm, specific surface area: 210 m$^2$/g), was prepared in the same manner as in the process for producing the electrode catalyst having platinum supported thereon, of Example 1, by changing the amount of chloroplatinic acid aqueous solution added. Such an electrode catalyst was measured by the X-ray powder diffraction, and the particle size of platinum was about 2.1 nm.

A coating liquid (a)-13 was prepared in the same manner as in the process for producing the coating liquid (a)-1 of Example 1, except that the coating liquid was prepared by using 4.9 g of a catalyst having platinum supported (amount of platinum supported: 0.5 mass %) on a carbon ($d_{002}$ 0.339 nm, specific surface area: 210 m$^2$/g) and using fine particles of iridium oxide hydrate having a specific surface area of 10 m$^2$/g by a BET measuring method.

The coating liquid (a)-13 was applied on the polypropylene substrate film by a die coater, followed by drying for 10 minutes in a dryer at 80° C. to form an anode catalyst layer (13).

The thickness of the anode catalyst layer (10), the iridium metal amount (M) (mg/cm$^2$) in the iridium oxide hydrate and the ratio (C)/(M) of the carbon support (C) (mg/cm$^2$) in the electrode catalyst to the iridium metal amount (M) (mg/cm$^2$) in the iridium oxide hydrate, are shown in Table 1.

A membrane/electrode assembly (13) was obtained in the same manner as in the process for producing the membrane/electrode assembly (1) of Example 1, except that the anode catalyst layer (1) was changed to the anode catalyst layer (13).

II. Evaluation of Performance of Membrane/Electrode Assembly (13)

Evaluation of the initial performance and the fuel deficient resistance of the membrane/electrode assembly, when the humidity condition of the membrane/electrode assembly (13) was changed, was carried out in the same manner as in Example 1. The evaluation results are shown in Tables 2 and 3.

Example 14

I. Process for Producing Membrane/Electrode Assembly (14)

A coating liquid (a)-14 was prepared in the same manner as in the process for producing the coating liquid (a)-1 of Example 1, except that 0.62 g of iridium oxide hydrate (IrO$_x$·(H$_2$O)$_y$, Ir metal content: 76.0%) was changed to 0.62 g of ruthenium oxide (RuO$_2$, Ru metal content: 76.0%), and the coating liquid was prepared by using fine particles of ruthenium oxide having a specific surface area of 10 m$^2$/g by the BET method.

The coating liquid (a)-14 was applied on a polypropylene substrate film by a die coater, followed by drying for 10 minutes in a dryer at 80° C. to form an anode catalyst layer (14).

The thickness of the anode catalyst layer (14), the ruthenium metal amount (M) (mg/cm$^2$) in the ruthenium oxide and the ratio (C)/(M) of the carbon support (C) (mg/cm$^2$) in the electrode catalyst to the ruthenium metal amount (M) (mg/cm$^2$) in the ruthenium oxide, are shown in Table 1.

A membrane/electrode assembly (14) was obtained in the same manner as in the process for producing the membrane/electrode assembly (1) of Example 1, except that the anode catalyst layer (1) was changed to the anode catalyst layer (14).

II. Evaluation of Performance of Membrane/Electrode Assembly (14)

Evaluation of the initial performance and the fuel deficient resistance of the membrane/electrode assembly, when the humidity condition of the membrane/electrode assembly (14) was changed, was carried out in the same manner as in Example 1. The evaluation results are shown in Tables 2 and 3.

Example 15

I. Process for Producing Membrane/Electrode Assembly (15)

A coating liquid (a)-15 was prepared in the same manner as in the process for producing the coating liquid (a)-1 of Example 1, except that 0.62 g of iridium oxide hydrate (IrO$_x$·(H$_2$O)$_y$, Ir metal content: 76.2%) was changed to 0.47 g of a powder of iridium fine particles, and the coating liquid was prepared by using the iridium fine particles having a specific surface area of 10 m$^2$/g by the BET method.

The coating liquid (a)-15 was applied on a polypropylene substrate film by a die coater, followed by drying for 10 minutes in a dryer at 80° C. to form an anode catalyst layer (15).

The thickness of the anode catalyst layer (15), the ruthenium metal amount (M) (mg/cm$^2$) in the ruthenium oxide and the ratio (C)/(M) of the carbon support (C) (mg/cm$^2$) in the electrode catalyst to the ruthenium metal amount (M) (mg/cm$^2$) in the ruthenium oxide, are shown in Table 1.

A membrane/electrode assembly (15) was obtained in the same manner as in the process for producing the membrane/electrode assembly (1) of Example 1, except that the anode catalyst layer (1) was changed to the anode catalyst layer (15).

II. Evaluation of Performance of Membrane/Electrode Assembly (15)

Evaluation of the initial performance and the fuel deficient resistance of the membrane/electrode assembly, when the humidity condition of the membrane/electrode assembly (15) was changed, was carried out in the same manner as in Example 1. The evaluation results are shown in Tables 2 and 3.

Example 16

I. Process for Producing Membrane/Electrode Assembly (16)

A coating liquid (a)-16 was prepared in the same manner as in the process for producing the coating liquid (a)-1 of Example 1, except that 0.62 g of iridium oxide hydrate (IrO$_x$·(H$_2$O)$_y$, Ir metal content: 76.2%) was changed to 0.46 g of a powder of ruthenium fine particles, and the coating liquid was prepared by using the iridium fine particles having a specific surface area of 10 m$^2$/g by the BET method.

The coating liquid (a)-16 was applied on a polypropylene substrate film by a die coater, followed by drying for 10 minutes in a dryer at 80° C. to form an anode catalyst layer (16).

The thickness of the anode catalyst layer (16), the ruthenium metal amount (M) (mg/cm$^2$) in the ruthenium fine particles and the ratio (C)/(M) of the carbon support (C) (mg/cm$^2$) in the electrode catalyst to the ruthenium metal amount (M) (mg/cm$^2$) in the ruthenium oxide, are shown in able 1.

A membrane/electrode assembly (16) was obtained in the same manner as in the process for producing the membrane/electrode assembly (1) of Example 1, except that the anode catalyst layer (1) was changed to the anode catalyst layer (16).

II. Evaluation of Performance of Membrane/Electrode Assembly (16)

Evaluation of the initial performance and the fuel deficient resistance of the membrane/electrode assembly, when the humidity condition of the membrane/electrode assembly (16) was changed, was carried out in the same manner as in Example 1. The evaluation results are shown in Tables 2 and 3.

TABLE 1

|  | Amount of platinum or platinum alloy supported in anode catalyst (mass %) | Fine particles | Specific surface area of fine particles ($m^2$/g) | Metal content (M) of fine particles in anode layer as calculated as metal (mg/$cm^2$) | (C)/(M) | Thickness of anode catalyst layer (μm) |
|---|---|---|---|---|---|---|
| Ex. 1 | 20 | Iridium oxide | 1.5 | 0.04 | 10/1 | 8 |
| Ex. 2 | 20 | Iridium oxide | 8.0 | 0.008 | 21/1 | 7 |
| Ex. 3 | 20 | Iridium oxide | 10 | 0.04 | 5/1 | 8 |
| Ex. 4 | 20 | Iridium oxide | 10 | 0.02 | 5/1 | 10 |
| Ex. 5 | 20 | Iridium oxide | 10 | 0.08 | 10/1 | 8 |
| Ex. 6 | 20 | Iridium oxide | 10 | 0.11 | 6.3/1 | 11 |
| Ex. 7 | 20 | Iridium oxide | 55 | 0.04 | 10/1 | 8 |
| Ex. 8 | 20 | Iridium oxide | 3 | 0.04 | 10/1 | 8 |
| Ex. 9 | 20 | Iridium oxide | 48 | 0.04 | 10/1 | 8 |
| Ex. 10 | 5 | Iridium oxide | 10 | 0.04 | 10/1 | 13 |
| Ex. 11 | 10 | Iridium oxide | 10 | 0.04 | 10/1 | 10 |
| Ex. 12 | 30 | Iridium oxide | 10 | 0.09 | 8.9/1 | 7 |
| Ex. 13 | 0.5 | Iridium oxide | 10 | 0.04 | 10/1 | 15 |
| Ex. 14 | 20 | Ruthenium oxide | 10 | 0.04 | 10/1 | 8 |
| Ex. 15 | 20 | Iridium | 10 | 0.04 | 10/1 | 8 |
| Ex. 16 | 20 | Ruthenium | 10 | 0.04 | 10/1 | 8 |

TABLE 2

|  | Initial voltage (V) Conditions: Cell temperature: 80° C. Anode side: hydrogen having a dew point of 80° C. Cathode side: air having a dew point of 80° C. | Initial voltage (V) Conditions: Cell temperature: 80° C. Anode side: hydrogen having a dew point of 50° C. Cathode side: air having a dew point of 80° C. | Initial voltage (V) Conditions: Cell temperature: 80° C. Anode side: hydrogen having a dew point of 80° C. Cathode side: air having a dew point of 50° C. |
|---|---|---|---|
| Ex. 1 | 0.49 | 0.50 | 0.48 |
| Ex. 2 | 0.58 | 0.59 | 0.57 |
| Ex. 3 | 0.62 | 0.61 | 0.62 |
| Ex. 4 | 0.61 | 0.61 | 0.60 |
| Ex. 5 | 0.60 | 0.61 | 0.60 |
| Ex. 6 | 0.57 | 0.58 | 0.58 |
| Ex. 7 | 0.51 | 0.52 | 0.46 |
| Ex. 8 | 0.57 | 0.58 | 0.56 |
| Ex. 9 | 0.56 | 0.57 | 0.56 |
| Ex. 10 | 0.57 | 0.59 | 0.58 |
| Ex. 11 | 0.56 | 0.58 | 0.56 |
| Ex. 12 | 0.54 | 0.55 | 0.43 |
| Ex. 13 | 0.52 | 0.53 | 0.42 |
| Ex. 14 | 0.55 | 0.56 | 0.55 |
| Ex. 15 | 0.58 | 0.60 | 0.59 |
| Ex. 16 | 0.56 | 0.58 | 0.57 |

TABLE 3

|  | Initial output voltage (V) | Voltage (V) after fuel deficient resistance test | Difference ΔV (V) between initial output voltage and voltage after fuel deficient resistance test |
|---|---|---|---|
| Ex. 1 | 0.49 | 0.33 | 0.16 |
| Ex. 2 | 0.58 | 0.51 | 0.07 |
| Ex. 3 | 0.62 | 0.60 | 0.02 |
| Ex. 4 | 0.61 | 0.57 | 0.04 |
| Ex. 5 | 0.60 | 0.57 | 0.03 |
| Ex. 6 | 0.57 | 0.51 | 0.06 |
| Ex. 7 | 0.51 | 0.37 | 0.14 |
| Ex. 8 | 0.57 | 0.51 | 0.06 |
| Ex. 9 | 0.56 | 0.51 | 0.05 |
| Ex. 10 | 0.57 | 0.50 | 0.07 |
| Ex. 11 | 0.56 | 0.50 | 0.06 |
| Ex. 12 | 0.54 | 0.43 | 0.11 |
| Ex. 13 | 0.52 | 0.41 | 0.11 |
| Ex. 14 | 0.55 | 0.47 | 0.08 |
| Ex. 15 | 0.58 | 0.51 | 0.07 |
| Ex. 16 | 0.56 | 0.47 | 0.09 |

According to the evaluation results in Table 2, it is evident that the membrane/electrode assembly of the present invention has a high voltage and is capable of stably power generating in a wide humidity range of from a low humidification to a high humidification.

According to the evaluation results in Table 3, it is evident that the membrane/electrode assembly of the present invention is scarcely susceptible to deterioration in the performance of the electrode even when fuel becomes deficient.

Industrial Applicability

By using the membrane/electrode assembly for a polymer electrolyte fuel cell of the present invention, it is possible to obtain a polymer electrolyte fuel cell which has a high power generation performance in an environment ranging from a low humidity to a high humidity and is scarcely susceptible to deterioration in the performance of the electrode even when fuel becomes deficient, whereby such a polymer electrolyte fuel cell is suited for an automotive power source, etc. which is used in various environments and is demanded for a high power generation performance.

Further, by the process for producing the membrane/electrode assembly for a polymer electrolyte fuel cell of the present invention, it is possible to easily produce a membrane/electrode assembly for a polymer electrolyte fuel cell which has a high power generation performance in an environment ranging from a low humidity to a high humidity and is scarcely susceptible to deterioration of the electrode even when fuel becomes deficient, whereby it is economically advantageous.

The entire disclosure of Japanese Patent Application No. 2007-330890 filed on Dec. 21, 2008 including specification, claims, drawings and summary is incorporated herein by reference in its entirety.

What is claimed is:

1. A membrane/electrode assembly for a polymer electrolyte fuel cell, comprising:
   an anode having an anode catalyst layer comprising an anode catalyst and an ion-exchange resin;
   a cathode having a cathode catalyst layer comprising a cathode catalyst and an ion-exchange resin; and
   a polymer electrolyte membrane disposed between the anode and the cathode,
   wherein the anode catalyst is one of platinum and a platinum alloy supported on a carbon support, the platinum or platinum alloy in the anode catalyst is in an amount of from 1 to 25 mass %, the anode catalyst layer has a thickness in a range of from 1 to 30 μm, the anode catalyst layer includes fine particles made of at least one member selected from the group consisting of iridium oxide, iridium, ruthenium oxide and ruthenium, the fine particles have a specific surface area in a range of from 2 to 50 $m^2/g$ and a content as calculated as metal in a range of from 0.01 to 0.09 $mg/cm^2$, and the ratio of a content of the carbon support in the anode catalyst to the content of the fine particles as calculated as metal is in a range of from 30/1 to 2/1.

2. The membrane/electrode assembly for a polymer electrolyte fuel cell according to claim 1, wherein the anode catalyst is the platinum supported on the carbon support.

3. The membrane/electrode assembly for a polymer electrolyte fuel cell according to claim 1, wherein the specific surface area of the fine particles is in a range of from 2 to 20 $m^2/g$.

4. The membrane/electrode assembly for a polymer electrolyte fuel cell according to claim 1, wherein the carbon support is a highly graphitized carbon support.

5. The membrane/electrode assembly for a polymer electrolyte fuel cell according to claim 1, wherein the carbon support is a highly graphitized carbon support having $d_{002}$ in a range of from 0.335 to 0.362 nm and a specific surface area in a range of from 100 to 300 $m^2/g$.

6. The membrane/electrode assembly for a polymer electrolyte fuel cell according to claim 1, wherein the carbon support has an average lattice spacing $d_{002}$ of [002] face in a range of from 0.335 to 0.390 nm and a specific surface area in a range of from 100 to 1,500 $m^2/g$.

7. The membrane/electrode assembly for a polymer electrolyte fuel cell according to claim 1, wherein the carbon support is a highly amorphous carbon support.

8. The membrane/electrode assembly for a polymer electrolyte fuel cell according to claim 1, wherein the amount of the platinum or platinum alloy supported on the carbon support is in a range of from 1 to 21 mass %.

9. The membrane/electrode assembly for a polymer electrolyte fuel cell according to claim 1, wherein the amount of the platinum or platinum alloy supported on the carbon support is in a range of from 3 to 21 mass %.

10. The membrane/electrode assembly for a polymer electrolyte fuel cell according to claim 1, wherein the anode catalyst is the platinum alloy supported on the carbon support.

11. The membrane/electrode assembly for a polymer electrolyte fuel cell according to claim 1, wherein the anode catalyst is the platinum alloy supported on the carbon support, and the platinum alloy is at least one metal selected from the group consisting of a platinum group metal other than platinum, gold, silver, chrome, iron, titanium, manganese, cobalt, nickel, molybdenum, tungsten, aluminum, silicon, zinc and tin.

12. The membrane/electrode assembly for a polymer electrolyte fuel cell according to claim 1, wherein the specific surface area of the fine particles is in a range of from 2 to 40 $m^2/g$.

13. The membrane/electrode assembly for a polymer electrolyte fuel cell according to claim 1, wherein the anode catalyst layer has the content of the fine particles as calculated as metal in a range of from 0.01 to 0.05 $mg/cm^2$.

14. The membrane/electrode assembly for a polymer electrolyte fuel cell according to claim 1, wherein the ion-exchange resin of the anode catalyst layer has an ion-exchange capacity of from 0.5 to 2.0 meq/g dry resin.

15. The membrane/electrode assembly for a polymer electrolyte fuel cell according to claim 1, wherein the ion-exchange resin of the anode catalyst layer has the ion-exchange capacity of from 0.8 to 1.5 meq/g dry resin.

16. The membrane/electrode assembly for a polymer electrolyte fuel cell according to claim 15, wherein the ion-exchange resin of the anode catalyst layer is same as the ion-exchange resin of the cathode catalyst layer.

17. The membrane/electrode assembly for a polymer electrolyte fuel cell according to claim 1, wherein the ion-exchange resin of the anode catalyst layer comprises a fluoropolymer.

18. The membrane/electrode assembly for a polymer electrolyte fuel cell according to claim 1, wherein the ion-exchange resin of the anode catalyst layer comprises one of sulfonated polyarylene, sulfonated polybenzooxazole, sulfonated polybenzothiazole, sulfonated polybenzoimidazole, sulfonated polysulfone, sulfonated polyether sulfone, sulfonated polyether ether sulfone, sulfonated polyphenylene sulfone, sulfonated polyphenylene oxide, sulfonated polyphenylene sulfoxide, sulfonated polyphenylene sulfide, sulfonated polyphenylene sulfide sulfone, sulfonated polyether ketone, sulfonated polyether ether ketone, sulfonated polyether ketone ketone and sulfonated polyimide.

19. The membrane/electrode assembly for a polymer electrolyte fuel cell according to claim 1, wherein the ion-exchange resin of the anode catalyst layer comprises a copolymer comprising repeating units based on tetrafluoroethylene and repeating units based on a perfluorovinyl ether having a sulfonic group, and the repeating units based on the perfluorovinyl ether having the sulfonic group is obtained from a monomer represented by formula:

$$CF_2=CF(OCF_2CFX)_m-O_p-(CF_2)_n-SO_2-F$$

where m is an integer of from 0 to 3, n is an integer of from 1 to 12, p is 0 or 1, and X is F or $CF_3$.

20. The membrane/electrode assembly for a polymer electrolyte fuel cell according to claim 19, wherein the monomer is represented by one of formulae:

$$CF_2=CFO(CF_2)_qSO_2F, CF_2=CFOCF_2CF(CF_3)O(CF_2)_rSO_2F \text{ and}$$

$CF_2=CF(OCF_2CF(CF_3))_tO(CF_2)_sSO_2F$, where each of q, r and s is an integer of from 1 to 8, and t is an integer of from 1 to 3.

* * * * *